United States Patent Office 3,216,848
Patented Nov. 9, 1965

3,216,848
PRIMER FOR VINYL DISPERSION COATINGS
Donald P. Hart, Allison Park, and Roger M. Christenson, Gibsonia, Pa., assignors to Pittsburgh Plate Glass Company, Pittsburgh, Pa., a corporation of Pennsylvania
No Drawing. Filed Jan. 12, 1962, Ser. No. 165,939
14 Claims. (Cl. 117—75)

This invention relates to coating compositions and particularly to a primer composition for use under films of fused vinyl resin dispersions such as plastisols, modified plastisols and organosols.

These vinyl dispersions are resinous compositions prepared by dispersing finely pulverulent thermoplastic materials such as polyvinyl halides, vinyl halide copolymers, and polymethacrylates in a plasticizer such as one of the liquid diesters of dicarboxylic acids in alcohol; for example, dioctyl phthalate and other phthalates. The phosphate type such as tricresyl phosphate is also useful. The resultant composition is a free flowing paste which has varying viscosities depending upon the degree of compatibility or solubility of the thermoplastic particles in the plasticizer; the higher the degree of solubility, the more viscous the paste becomes. These vinyl dispersions which contain solvents to improve their flow properties are commonly defined as organosols; however, if only a few parts of thinner are added to improve the flow of the vinyl dispersion, the dispersion is defined as a modified plastisol. Plastisols and organosols are used where their mobility enables them to be spread, sprayed, pumped, coated, molded or foamed. Subsequent to application the dispersions are usually heated until the resin dissolves in the plasticizer and the solvent, if any, has been flashed. As the formed solution cools it becomes a hard, tough material. This technique is commonly known as fusion.

Usually films or coatings made from such compositions are extremely tough and may be subjected to severe strain, shear, and other forces which may tend to warp or stretch the film. Moreover, these coatings have unusually good resistance to the action of chemicals. Plastisols, however, have relatively poor adhesion to many of the common metals such as steel, magnesium, aluminum, and the like. Adhesion of plastisols to many such materials as the ceramics, particularly glazed or partially glazed ceramics, is also poor.

Many attempts have been made to obtain adhesion of plastisols to the foregoing materials or to other materials with which plastisols have but poor adhesion by employing various compositions as primers between the substrate and the plastisol films. An important use for the plastisols is to coat metal sheeting which is subsequently fabricated into bottle caps, container lids, television and radio chassis and other articles which are prepared using a stamping procedure. Obviously, a coating which is able to withstand the severe strain, etc., imposed upon the film during the stamping must be extremely tough and durable. If a composition is to be used as a primer for these plastisol materials, it must be equally as tough as the plastisol and must adhere tenaciously both to the substrate and to the plastisol finishing top coat.

In copending application Serial No. 634,564, filed January 16, 1957, now U.S. Patent No. 3,011,909, there are disclosed compositions which are particularly adaptable for use as a primer under plastisol finishing coats. The compositions disclosed therein contain three components:

(1) An epoxy resin
(2) A phenolic resin
(3) A methyl methacrylate polymer or copolymer These compositions are applied to a metal substrate, coated with the plastisol composition and cured at a temperature ranging from about 300° F. to about 400° F. While these compositions give good adhesion, it has been found that it is difficult to obtain consistent results from them. For example, while many times an excellent bond is formed between the plastisol and the primer material, there has been shown to be a lack of adhesion when the films are subjected to humidity or water; also, erratic results on elongation of the metal substrate and evidence of lack of compatibility between each of the three components often result. While the cause of the inconsistent results in the use of the said primer compositions is not definitely known, it is suspected that the epoxy and phenolic component cures into a thermosetting component which has good adhesion to the substrate and that the methacrylate resin remains as a thermoplastic mass providing sites for adhesion to the thermoplastic plastisol top coat. The evidence of lack of compatibility suggests that this three-component blend forms a heterogeneous matrix of thermoplastic material within the thermosetting material.

It has now been discovered that the above three-component system can be made into a more homogeneous composition by the coreaction of the various components. The compositions have excellent compatibility and adhesion to both the metal substrate and the plastisol finishing top coat if the methyl methacrylate polymer contains a minor amount, for example, from about 2 percent to about 40 percent by weight and preferably 5 percent to 20 percent of a vinyl monomer of the following structure:

(I)
$$CH_2=\overset{R}{\underset{|}{C}}Z$$

wherein R is hydrogen or a lower alkyl radical and Z is selected from the group consisting of

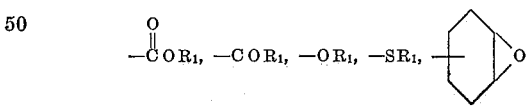

and

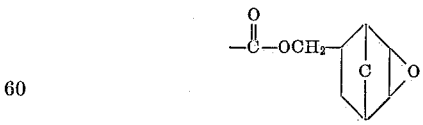

radicals and $R_1$ is a radical derived by removing a hydroxyl group from a polyol or a hydroxyl containing epoxy compound having from 2 to 6 hydroxyl groups or a radical derived by the removal of the halogen from a halogen substituted aliphatic epoxide such as an epihalohydrin.

Various compounds which fall into the class represented by general Formula I are prepared by any one of several well-known methods; for instance, glycidyl methacrylate may be prepared by the reaction of the sodium salt of the methacrylic acid with epichlorohydrin utilizing a polymerization inhibitor such as hydroquinone; beta-hydroxyethyl methacrylate may be prepared from the condensation of methacrylic acid with ethylene oxide; vinyl cyclohexene monoxide is easily prepared from the corresponding unsaturated vinyl cyclohexene by way of selective oxidation with a per acid such as peracetic acid and glycerol alpha allyl ether may be prepared by reacting allyl chloride with glycerine and a suitable catalyst. Other methods of preparation may also be utilized.

Various polyvols which may be employed in producing the compounds of Formula I include as a preferred group ethylene glycol, diethylene glycol, propylene glycol, 1,4-butanediol, trimethylolethane, trimethylolpropane, trimethylolhexane, trimethylolheptane, 1,2,6-hexanetriol, pentaerythritol, dipentaerythritol, sorbitol, (1,2,3,4,5,6-hexanehexol), and the like.

The epihalohydrins and like halogen substituted aliphatic epoxide compounds which provide the source for the epoxide structure represented by the general Formula I include the bromine and chlorine derivatives of the terminal epoxide containing lower alkyl compounds such as those prepared from propylene, butylene, pentylene, and the like.

This copolymer is then blended with an epoxy resin or epoxy ester resin and a heat reactive phenolic resin. It has been found that these compositions when employed as primers under the plastisol finishing coats consistently yield excellent results on elongation tests wherein a coated metal panel is stretched about 25 to 35 percent of its original length. After elongation the coating system maintains good adhesion after immersion in boiling water for at least 15 minutes.

The compositions of this invention comprise as an essential component a polymer containing a compound of the structure of Formula I and at least one alkyl ester of methacrylic acid and a lower aliphatic alcohol, for example, methyl alcohol, ethyl alcohol, propyl alcohol, butyl alcohol, isobutyl alcohol, and the like. Typical of the compounds which are defined by Formula I are glycidyl methacrylate, beta-hydroxyethyl methacrylate, glycerol alpha-allyl ether, hydroxyethyl vinyl sulfide, 2-vinyl thiotheyl glycidyl ether, vinylcyclohexane monoxide, the epoxidized reaction product of cyclopentadiene and allyl alcohol (Cyclol) which has been esterified with an alpha, beta-unsaturated carboxylic, acid, preferably a monocarboxylic acid, and beta-hydroxyethyl vinyl ether. While these compounds are preferred, other analogues may be used. It is important, however, that the compound represented by Formula I be present in amounts within the range of from about 2 percent to about 40 percent and preferably 5 percent to 20 percent. The methacrylic acid ester component may comprise from about 60 percent to abut 98 perecnt of the polymerizable monomer.

The interpolymers of the instant invention are ordinarily prepared by free radical techniques. Almost any well-known free radical initiator such as peroxygen catalysts or the redox type catalysts may be employed. The reaction is preferably carried out in a non-aqueous medium such as the well-known organic solvents, typical of which are acetone and toluene.

Epoxy resins adapted to be incorporated with the foregoing interpolymers of methacrylic acid ester and added monomer comprise a relatively large class of materials and many patents have been issued covering the same. The following are a few of such U.S. patents:

2,582,985
2,615,007
2,615,008
2,467,171

In general, these epoxy resins comprise a glycidyl polyether which is the product of condensation of a polyhydric phenol and an epoxy compound or preferably a chloro-epoxy compound, such as epichlorohydrin, in the presence of an alkali adapted to effect condensation of the compounds to form polyethers. The polyethers or epoxy resins resulting from the reaction of epichlorohydrin and a diphenol substituted alkyl hydrocarbon are presently preferred. The compound known as bisphenol A, a common name for p,p'-isopropylidene diphenol, is presently the most widely commercialized representative of the dihydric phenol class which may be employed in the reaction. The poxy resin may have an epoxy equivalent of about 150 to 4,000 with a preferred range of 1,000 to 2,000.

Many epoxy resins which are satisfactory for use in the practice of the invention are now available commercially and if desired may be employed in the practice of the present invention. Such resins include the Epon resins sold by the Shell Chemical Corporation, and include Epon 1001, Epon 1004, Epon 1007, Epon 1009, and Epon 828. The product known as Jones Dabney's Epi-Rez 540 may be utilized.

The functionality of the various epoxy resins may, if desired, be controlled through esterification. The above-described epoxy resins may advantageously be reacted with monocarboxylic acids, particularly the fatty acids such as those obtained from linseed oil, soya oil, safflower oil, perilla oil, tung oil, oiticia oil, poppyseed oil, sunflower oil, tall oil, walnut oil, dehydrated castor oil, herring oil, menhaden oil, sardine oil, and the like. It is important, however, that the epoxy resins be only partially esterified. In order to have significant co-reaction between the phenolic resin, epoxy resin and the interpolymers of the compounds of Formula I at least about 50 percent of the epoxide or hydroxy groups of the epoxy resin should remain unesterified. The epoxy resins may be esterified simply by refluxing the epoxy resin in the presence of one or more of the carboxylic acids while simultaneously removing water azeotropically.

The following example sets forth the esterification of an epoxy ester which may be used in preparing the compositions of the instant invention.

EXAMPLE A

| | Parts by weight |
|---|---|
| Epoxy resin (Epon 1007) | 30.0 |
| Tall oil fatty acid (Aconew Extra) | 2.4 |
| Xylene | 16.2 |
| Cellosolve acetate | 16.2 |

An epoxy ester was prepared from the Epon 1007 and the tall oil fatty acid (Aconew Extra) by conventional techniques and then thinned with the xylene-Cellosolve acetate mixture. The resulting resinous composition had the following composition:

| | |
|---|---|
| Solids (percent) | 50.2 |
| Viscosity (Gardner-Holdt) | Y |
| Color (Gardner) | 5+ |
| Wt./gal. (lbs.) | 8.58 |
| Acid value | 1.30 |

In addition to the epoxy resins which are prepared by the reaction of a polyhydric phenol and a chloroepoxy compound, the epoxidized ring compounds such as disclosed in U.S. Patent 2,716,123 may also be used. Union Carbide's EP–201 is an example of the commercially available epoxidized ring compounds.

The oxirane type epoxy compounds may also be used in place of the epoxy resins and particularly include the epoxidized unsaturated linear compounds such as epoxidized polybutadiene. These compounds are available commercially under the trade name Oxiron.

Heat reactive phenolic resins which may be mixed with the epoxy resin component, or added to the interpolymer component concurrently with or subsequent to the addition of the epoxy resin are usually condensation products of a phenol and an aldehyde, preferably formaldehyde, the reaction being halted before the final nonreactive, thermoset state is attained. These materials are still capable of further homopolymerization to or toward the final thermoset, insoluble stage.

Phenols which may be condsensed with formaldehyde in the preparation of the phenolic resin component comprise monohydric phenols, such as phenol per se, cresol, and phenols comprising single hydroxyl groups and one or more hydrocarbon side chains. The monobutenyl phenols containing a butenyl group in ortho-, meta- or para-position and where the double bond occurs between the first and second, the second and third, or third and fourth carbon atoms in the hydrocarbon chain are included. Cyclopentenyl phenols are also included. Phenols having multiple hydroxyl groups may also be used.

The preparation of heat reactive phenolic resins is well understood by those skilled in the art, being reported, for example, in Payne, Organic Coating Technology, volume I, pp. 167 and 171, 1954. Many commercial heat reactive phenolics are available and may be used for modifying or blending with the epoxy resin component of applicants' improved coating compositions.

In the preparation of the novel coating compositions of this invention, the epoxy resin and the phenolic resin may be incorporated as separated entities with the interpolymer of the compound of Formula I and the methacrylic acid ester or, if preferred, the epoxy resin and the phenolic resin may be blended together in the well-known manner and then incorporated with the interpolymer.

The heat reactive phenolic component may be employed in a proportion approximately within a range of 10 to 50 percent based upon the mixture thereof with epoxy resin component.

The blend of epoxy resin and phenolic resin may be incorporated with the interpolymer of methacrylic acid ester and added monomer in a relatively broad range of proportions.

The interpolymers of the compounds of formula I and the methacrylate esters may be incorporated with varying proportions of the epoxy resins and phenolic resins of the heat reactive type. A range of about 50 percent to 95 percent of the said interpolymer may be employed, with the preferred range being from about 75 percent to about 90 percent. The rest of the mixture is the blend of epoxy resin and heat reactive phenolic resin.

The epoxy resin preferably is employed in an amount of about 50 to 90 percent by weight based upon the combined weights of epoxy resin and phenolic resin. Upon a like basis, the amount of phenolic resin is 10 to 50 percent by weight. If modifying resins, synthetic rubbers or other components are included in the mixture, departures from these proportions may be desirable.

The blends of the interpolymer of the compound of Formula I, epoxy resin and heat reactive phenolic resin may be used in many coating applications as for instance in the relatively exacting use as a primer under plastisol films without further modification. However, in those instances where the film is to be subjected to severe flexing or even stretching or comprising in the shaping of precoated sheet metal articles or the like, it is sometimes desirable to include an added component or modifier designed to increase the elongation of the cured films.

Modifiers such as rubbery interpolymers of butadiene and acrylonitrile or the various interpolymers of vinyl chloride and vinyl acetate may be used to enhance the physical properties of the compounds of the instant invention. Copolymers comprising about 50 percent by weight of butadiene with acrylonitrile are particularly desirable and may be obtained commercially under the name "Hycar" (B. F. Goodrich Chemical Company). Commercially available vinyl chloride-vinyl acetate copolymers which are particularly advantageous for the instant purpose are VAGH and VMCH. The former contains hydroxyl modification, while the latter approximately comprises 86 percent vinyl chloride, 13 percent vinyl acetate and about 1 percent interpolymerized maleic acid.

While the compositions as herein disclosed may be employed as intermediate coatings or as finish coatings, the use of the material as a primer coating for plastisols is primary. The compositions of the instant invention comply with the severe requirements imposed upon the plastisol primer system.

The compositions of this invention may be applied by spraying, by brushing, by roller coating, dipping or by any other convenient technique. In those instances in which the composition is to be employed as a primer coating for a plastisol finishing film, the primer films may be of relatively slight thickness, e.g., from about 0.03 mil to 1 mil, though of course thicker films can also be prepared.

Cure may be effected by a quick bake (2 to 10 minutes) at a temperature within a range of about 150° F. to 400 F. If desired, the solvents may be evaporated from the film at lower temperatures, for example, atmospheric or room temperatures, over a longer period, for example about 30 minutes; and the film ultimately cured during the fusing of the plastisol. Bakes at about 350° F. are especially suitable for the formation of films which are highly resistant to salt spray and caustics. At these temperatures, a cure of about 5 minutes is satisfactory.

The plastisols which may be employed as top finishing coats for the instant invention may be any of the well-known thermoplastic materials containing chemical plasticizers. In addition to the standard polyvinyl chloride plastisol compositions, the methyl methacrylate and polyvinyl chloride organosols and various lacquer top coats such as a plasticized methyl methacrylate polymer and other acrylic lacquers which are made from polymers of methyl methacrylate may be employed.

A useful plastisol material for application over the primer compositions disclosed in the examples to follow comprises polyvinyl chloride in finely pulverulent form dispersed in a plasticizer, such as an organic diester of a dicarboxylic acid. Commercial embodiments of polyvinyl chloride are sold under the trade names of Vinylite QYNV, Geon 121, etc. These readily disperse in the ester plasticizers such as those herein disclosed. Plasticizers in which the polyvinyl chloride may be dispersed may be divided into two main classes, primary and secondary. These are often used in combination. The primary plasticizers have considerable capacity for dissolving polyvinyl chloride and are of assistance in promoting the fusion of the particles of plastic to form a continuous film. The secondary plasticizer has a lower action as a solvent. These help obtain and maintain high fluidity in the dispersion on aging. The proportion thereof with respect to the primary plasticizer is often as high as possible, consistent with producing a suspension in which the particles of plastic will readily fuse when the films are heated. The following is a list of primary and secondary plasticizers, which may be used in formulating plastisols adapted for use in practicing this invention.

Plastisol plasticizers

PRIMARIES (GOOD SOLVENTS FOR POLYVINYL CHLORIDE)

| Trade Name or No. | Chemical Type | Appearance | Supplier |
| --- | --- | --- | --- |
| GP-261 | Dioctyl phthalate ester | Water white liquid | B. F. Goodrich Chemical Co. |
| Plastolein 9058 | Di-2-ethylhexyl azelate | do | Emery Industries Incorporated. |
| KP-220 | Capryl glycollate | Yellow liquid | Ohio Apex, Incorporated. |
| Hercoflex 250 | Phthalate ester | Water white liquid | Hercules Powder Company. |
| A.T.B.C. | Acetyl tributylcitrate | do | Charles Pfizer & Company. |
| Cabflex DIOZ | Diisooctyl azelate | Yellow liquid | Godfrey L. Cabot. |
| Paraplex G-62 | Polymeric epoxidized oil | do | Rohm & Haas. |
| Admex 710 | Epoxy | do | Archer-Daniels-Midland. |
| Plastoflex MGB | Polypropylene glycol | do | Advance Solvents & Chemical Co. |
| PX-114 | Decylbutyl phthalate | Water white liquid | Pittsburgh Coke & Chemical Co. |
| Morflex P-30 | Semi-polymeric (polyester) | do | Morton-Withers. |
| Morflex P-40 | Polyester | Yellow liquid | Do. |
| Morflex #410 | Di-2-ethylhexyl azelate and tricresyl phosphate. | Water white liquid | Do. |

SECONDARIES (POOR SOLVENTS FOR POLYVINYL CHLORIDE)

| Trade Name or No. | Chemical Type | Appearance | Supplier |
| --- | --- | --- | --- |
| GP-261 | Phthalate | Water white liquid | B. F. Goodrich Chemical Co. |
| Flexricin 66 | Ricinoleate | do | Baker Castor Oil Co. |
| Staflex LA | Sebacate/adipate | Yellow liquid | Deecy Products, Incorporated. |
| Staflex MP | Dialkyl phthalate (mixed alcohol) | do | Do. |
| Plastoflex FE-6 | Fatty ester | do | Advance Solvents & Chemical Co. |
| Carbol 100 | Aromatic hydrocarbon | Brown liquid | Godfrey L. Cabot. |
| Hercolyn | Methyl ester | Yellow liquid | Hercules Powder Company. |
| Pycal 170 | Fatty acid | Orange liquid | Atlas Powder Co. |
| Benzoflex 9-88 | Glycol dibenzoate ester | Water white liquid | Tennessee Product & Chemical Co. |
| Chloroparaffin #4004 | Chlorinated paraffin | Yellow liquid | Hlowax Product Company. |
| Paraplex G-53 | Polymeric ester | do | Rohm & Haas. |
| Conoco H-450 | Petroleum hydrocarbon | do | Continental Oil Company. |
| Golden Bear Oil | Petroleum hydrocarbon | Greenish brown liquid | Harwick Standard Company. |
| Solvaloid C | High boiling petroleum hydrocarbon | Oil | Socony Mobil Oil Company. |
| MGL | Polyethylene glycol dimethacrylate | Liquid | Carbide & Carbon. |

Stabilizers for plastisols, for example, epoxy resins, tin laurate, lead salts, cadmium salts, or the like may also be included in the plastisol and are often desirable if the plastisol is to be baked at a substantial temperature or stored for a substantial period of time.

The following are examples of plastisol compositions which are adapted for applying as a finishing film over coatings as disclosed in the several examples illustrating primers. The primers may be applied upon substrates of steel, aluminum, magnesium, chromium and alloys thereof, ceramic materials such as clay pipe or other material.

EXAMPLE B

|  | Parts by weight |
| --- | --- |
| Polyvinyl chloride (Geon 121) | 550 |
| Dioctyl phthalate | 332 |

To these may be added smaller amounts of modifiers designed to tailor or refine the material for specific applications. Examples of minor ingredients comprise an epoxidized oil plasticizer, such as Paraplex G-62, which may be used in an amount of 83 pounds; stabilizers, e.g. Advastab T-22; pigments, such as titanium dioxide and iron oxide. While these minor constituents may be desirable in some applications, none of them is essential.

EXAMPLE C

A second plastisol composition suitable for use upon sheet steel which has been primed with compositions of the instant invention comprises:

|  | Parts by weight |
| --- | --- |
| Geon 121 (polyvinyl chloride) | 440 |
| Adipic acid esters | 190 |
| Dioctyl phthalate | 190 |
| Calcium carbonate (pigment) | 128 |

The mixture is stabilized with a commercial stabilizer as is customary in the art. One suitable stabilizer comprises a mixture of an epoxy resin such as Epon 828 and white lead.

EXAMPLE D

The plastisol composition of this example is useful for application over a primer such as is described in the following examples upon a ceramic material such as a sewer pipe. The plastisol comprises:

|  | Parts by weight |
| --- | --- |
| Polyvinyl chloride (Geon 121) | 301 |
| Calcium carbonate (pigment) | 265 |
| Diisodecyl phthalate | 150 |
| Diisodecyl adipate | 20 |
| Solvaloid C (high boiling petroleum hydrocarbon) | 279 |

The instant plastisol composition may be effectively employed as an organosol by adding varying amounts of solvents.

EXAMPLE E

This example relates to the preparation of a polymethyl methacrylate organosol which may be used advantageously with the primer compositions of the instant invention.

|  | Parts of weight |
| --- | --- |
| Polymethyl methacrylate powder (molecular weight 500,000) | 120 |
| Butyl benzyl phthalate (Santicizer 160) | 80 |
| Mineral spirits | 200 |
| High boiling aromatic naphtha (Solvesso 100) | 100 |
| Soya lecithin | 2 |

The above ingredients were ground in a ball mill about 48 hours to a grind of 6 to 7 whereupon the following ingredients were added.

|  | Parts by weight |
| --- | --- |
| Titanium dioxide pigment (rutile) | 46 |
| Phthalocyanine blue pigment | 2 |
| Butyl benzyl phthalate (Santicizer 160) | 2 |
| High boiling aromatic naphtha (Solvesso 100) | 100 |

The mixture was then ground for 4 more hours to effect homogeneity. Total solids content was 39 percent.

EXAMPLE F

The following example is the preparation of an acrylic lacquer which may be used advantageously as a top coat over the primer compositions of the instant invention.

| | Parts by weight |
|---|---|
| Copolymer comprising 90 percent methyl methacrylate and 10 percent lauryl methacrylate | 77.5 |
| Butyl benzyl phthalate (Santicizer 160) | 7.5 |
| Dicyclohexyl phthalate | 15.0 |
| Toluene | 205.0 |
| Xylene | 205.0 |
| Cellosolve acetate | 105.0 |

The above ingredients were formulated into a lacquer composition using titanium dioxide pigment at 28 percent pigment weight using conventional grinding technique.

The following examples are given by way of illustration and not by way of limitation. Their parts and percentages are by weight unless otherwise specified.

EXAMPLE I

| | Parts by weight |
|---|---|
| Methyl methacrylate | 60.0 |
| Acrylonitrile | 30.0 |
| Glycidyl methacrylate | 10.0 |
| Diacetone alcohol | 1.50 |
| Benzoyl peroxide | 0.5 |

The above ingredients were charged into a vessel equipped with stirrer, condenser and thermometer. The vessel was blown with inert gas for 2 minutes and heated with agitation to about 75° C. After 2 hours a solution containing 25 parts diacetone alcohol and 0.25 part benzoyl peroxide was added. The reaction mass was then maintained at a temperature between 75° C. and 85° C. with agitation for two successive 2-hour intervals prior to each of which was added a solution similar to the one before. The reaction mass was then cooled and 100 parts of diacetone alcohol was added thereto. The resulting resinous composition had the following properties:

| | |
|---|---|
| Total solids (percent) | 19.9 |
| Viscosity (Gardner-Holdt) | V |

EXAMPLE II

| | Parts by weight |
|---|---|
| Glycidyl methacrylate | 1.5 |
| Methyl methacrylate | 13.5 |
| Diacetone alcohol | 22.5 |
| Benzoyl peroxide | 0.075 |

A vessel equipped with stirrer, thermometer and condenser was blown with inert gas for 15 minutes, after which the above ingredients were charged therein and inert gas was blown gently across the surface of the reaction mass for 2 minutes. The reaction mass was heated to 176° F. and held at this temperature for 2 hours, after which 2.5 parts more of diacetone alcohol and 0.025 part of $Bz_2O_2$ were added. Two more additions of diacetone alcohol (2.5 parts) and benzoyl peroxide were made, two hours elapsing between each addition and with the temperature being held at 176° F. After another 2-hour period, 15 parts of diacetone alcohol were added to the reaction mass, stirred for 30 minutes and cooled. The resulting resinous composition had a Gardner-Holdt viscosity of $Z_3$ and a non-volatile content of 25 percent.

EXAMPLE III

| Solution A: | Parts by weight |
|---|---|
| Methyl methacrylate | 160 |
| Benzoyl peroxide | 1 |
| Solution B: | |
| Glycerol alpha allyl ether | 40 |
| Isopropyl acetate | 50 |

Solution B was charged into a vessel equipped with stirrer, condenser and thermometer and heated with agitation to 77° C. Solution A was then added dropwise to the vessel over a 1-hour and 45 minute period during which time the temperature rose to 96° C. More isopropyl acetate (30 parts) was then added to the reaction. After 40 minutes more isopropyl acetate was added (40 parts), the temperature being maintained between 89° C. and 91° C. The reaction mass was maintained at this temperature for another 20 minutes whereupon a solution containing 30 parts of isopropyl acetate and 0.5 part benzoyl peroxide were added. The reaction mass was maintained for another 2 hours at a temperature between 90 and 92° C. whereupon another addition of a solution containing the same ingredients was made. After 2 more hours at a temperature between 90 and 92° C. the reaction was terminated and the reaction product was adjusted to a 23.1 percent solids with 420 parts of diacetone alcohol.

EXAMPLE IV

| | Parts by weight |
|---|---|
| Methyl methacrylate | 160 |
| Hydroxyethyl vinyl ether | 40 |
| Diacetone alcohol | 80 |
| Benzoyl peroxide | 1 |

The above ingredients were heated under agitation for 2 hours, the temperature ranging from 78° C. to 89° C. A solution containing 30 parts of diacetone alcohol and 0.5 part benzoyl peroxide was then added to the reaction mass. Ten minutes later 100 parts more of diacetone alcohol were added. The reaction was then conducted at a temperature ranging between 75° C. and 79° C. for 1 hour and 50 minutes. A solution containing 70 parts diacetone alcohol and 0.5 part benzoyl peroxide was added. The reaction was then continued at a temperature between 75° C. and 88° C. for 2 more hours and terminated, whereupon 459 parts of diacetone alcohol were added. The resulting composition had the following properties:

| | |
|---|---|
| Total solids (percent) | 19.1 |
| Viscosity (Gardner-Holdt) | W+ |

EXAMPLE V

| | Parts by weight |
|---|---|
| Product of Example I | 56.3 |
| Epoxy resin, hydroxyl equivalent 130, epoxide equivalent 450–525 (Epon 1001) | 5.0 |
| BKS 2600 (50 percent denatured ethanol-phenolic resin solution) | 1.0 |
| Diacetone alcohol | 37.7 |

The above composition was intermixed and a film drawn down on cold rolled steel panels to give a 0.3 mil baked film. A vinyl chloride plastisol was applied to the primer. One coated panel was baked at 350° F. for 8 minutes and another coated panel was baked at 400° F. for 8 minutes. The baked panels contained a smooth continuous film having no blisters. Both of the examples were then placed in a Tinius-Olsen tensile tester and stretch at least 30 percent of their original length. The panels were then tested for adhesion with the result that the adhesion was as good as it was prior to the stretching.

EXAMPLE VI

The following two examples relate to typical formulations of plastisol primers of the instant invention.

| | Parts by weight |
|---|---|
| Resinous product of Example A | 42.00 |
| Chromium phosphate | 22.25 |
| Titanium dioxide | 25.75 |
| Diacetone alcohol | 27.75 |

The above ingredients were charged into a pebble mill and ground for 24 hours. A solution containing 25 parts by weight of the product of Example II and 15 parts by weight of diacetone alcohol was added to the mill and the mill was rotated for 1½ hours. Forty (40) parts of diacetone alcohol was then added to the mill as washout. The resultant paste (197.75 parts) was then admixed with 405 parts of the product of Example II, 25 percent solution, 8.25 parts of phenol formaldehyde resin (Bakelite BKS 2600) and 228.75 parts of diacetone alcohol. The pigmented formulation was then roll coated to give 0.2 to 0.4 mil dry film on cold rolled steel panels. The panels were then baked for 10 minutes at 350° F. The panels were then coated with a polyvinyl chloride (product of Example B) plastisol composition and again baked at 350° F. for 10 minutes.

The panels were then tested by stretching the panels to about 130 percent of their original length. They were then tested for adhesion before and after immersion in water for 15 minutes. The adhesion of the coating system remained good and substantially unchanged throughout the stretching and water soak.

EXAMPLE VII

The methyl methacrylate organosol of Example E was applied to a surface coated with the primer composition of the above Example VI which had been applied to phosphatized steel panels (Bonderite 100) and baked at 400° F. for 10 minutes. The organosol coated panels were then force dried at 140° F. for 15 minutes and then baked at 350° F. for 10 minutes. The resultant coated panels had excellent adhesion, excellen thumidity resistance and excellent salt spray ressitance.

EXAMPLE VIII

More panels coated with the baked composition of above Example VI were coated with the methyl methacrylate lacquer of Example F and baked at 225° F. for ½ hour. Excellent adhesion was obtained between the lacquer and the primer composition.

EXAMPLE IX

An extruded polyvinyl chloride sheet containing about 12 percent plasticizer (Lustran) was placed on a primed aluminum panel using the primer composition of Example VI. The sheet was then placed in a press and heated to 250° F. under a pressure of 1,000 pounds per inch for 10 minutes. The adhesion was excellent.

EXAMPLE X

Solution A:                                          Parts by weight
  Epoxy resin, hydroxyl equivalent 190, epoxide
    equivalent 1600–1900 (Epon 1007) _____ 21.00
  Diacetone alcohol _____ 21.00
Solution B:
  Chromium phosphate _____ 20.00
  Titanium dioxide _____ 23.50
  Diacetone alcohol _____ 40.25

The above ingredients were charged into a pebble mill and ground for 24 hours. Twenty-five (25) parts of the product of Example II (25 percent solution) and 15 parts of diacetone alcohol were added to the mill and ground for 1½ hours. Forty (40) parts of diacetone alcohol were then added to the mill as washout. The resultant paste (205.75 parts) was intermixed with 404.25 parts of product of Example II (25 percent solution) 8.25 parts of a 50 percent phenol formaldehyde resin-ethanol solution (Bakelite BKS 2600), and 220 parts of diacetone alcohol. The above ingredients were adjusted to a suitable viscosity with diacetone alcohol and roll coated to give 0.2 to 0.4 mil dry film on cold rolled steel panels. The panels were then baked for 10 minutes at 400° F. The panels were coated with a polyvinyl chloride (product of Example B) plastisol composition and again baked at 350° F. for 10 minutes.

The coated panels were then placed in a Tinius-Olsen tensile tester and stretched to a length which was 130 percent of the panels' original length. The primer-plastisol coating system maintained as good adhesion and continuity after the stretching as before.

EXAMPLE XI

Solution A:                                          Parts by weight
  Epoxy resin (Epon 1007) _____ 20.75
  Methyl isobutyl ketone _____ 20.75
Solution B:
  Chromium phosphate _____ 20.00
  Titanium dioxide pigment (rutile) _____ 23.25
  Diacetone alcohol _____ 39.75

The above ingredients were charged into a pebble mill and ground for 24 hours. The following ingredients were then added to the mill and ground until homogeneous.

Parts by weight
Product of Example III (20% diacetone)_____ 467.25
Phenolic resin (BKS 2600) _____ 8.25
Diacetone alcohol _____ 230.00

The above ingredients were adjusted to a suitable viscosity with diacetone alcohol and roll coated at a thickness of 0.2 mil to 0.4 mil on cold rolled steel panels. The panels were then baked for 10 minutes at 400° F. The panels were then coated with a polyvinyl chloride composition (product of Example B) and again baked at 350° F. for 10 minutes. The coated panels were tested in a Tinius-Olsen tensile tester and stretched to a length which was 130 percent of the panels' original length. The primer composition maintained as good adhesion and continuity after the stretching as before.

EXAMPLE XII

Parts by weight
Product of Example IV _____ 56.3
Paste (58.3 Epon 1007, 56 chromium phosphate,
  65.3 TiO$_2$ and 170.4 diacetone alcohol _____ 15.0
Phenolic resin (BKS 2600, 50 percent solids) _____ 1.0
Diacetone alcohol _____ 27.7

The above composition was applied as in Examples VI and VII to steel panels which were solvent washed and cured for 10 minutes at 400° F. The coating had an average thickness of from 0.2 to 0.3 mil. The panels were then coated with the plastisol (polyvinyl chloride, product of Example B) and cured for 30 minutes at 375° F. The coated panels were then placed in a Tinius-Olsen tensile tester and stretched to a length which was 130 percent of the panels' original length. The plastisol-primer coating system maintained as good adhesion and continuity after the stretching as before. The stretched coatings were peel tested by inserting a knife under the coating system until the coating could be gripped. A tensile force perpendicular to the panel was applied in increasing amounts until the coating either lost adhesion or the coating itself ruptured. In each instance the adhesion of the coating to the panel provide to be greater than the tensile strength of the coating.

The compositions of the instant invention, in addition to being used as primers for plastisols, or organosols and the like, may also be employed advantageously as primers for most thermoplastic polymer containing materials and resinous compositions including molded, extruded and laminated objects prepared using the said thermoplastic materials. The said primer compositions have an extremely good adhesion to thermoplastic materials, particularly the polyvinyl halide and the polyacrylates, and may be used as an agent for bonding together objects made from thermoplastic materials.

Although specific examples have been set forth hereinabove, it is not intended that the invention be limited solely thereto, but to include all of the variations and modifications falling within the scope of the appended claims.

We claim:
1. A primer for a vinyl dispersion coating consisting essentially of (1) an epoxy resin, (2) a phenol-formaldehyde resin, and (3) an interpolymer of methyl methacrylate and from about 2 percent to about 40 percent by weight based on said interpolymer of at least one compound represented by the formula:

wherein R is a member of the group consisting of hydrogen and lower alkyl radicals and Z is selected from the group consisting of

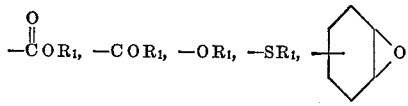

and

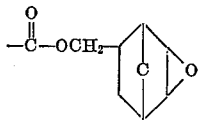

radicals wherein $R_1$ represents at least one member of the group consisting of radicals derived by removing a hydroxyl group from a polyol having 2 to 6 hydroxyl groups and radicals derived by removing the halogen atom from an epihalohydrin.

2. The composition of claim 1 wherein the epoxy resin is the reaction product of a diphenol and an epihalohydrin and the phenol-formaldehyde is heat reactive.

3. The composition of claim 1 wherein the interpolymer is an interpolymer of methyl methacrylate and glycidyl methacrylate and the epoxy resin is a reaction product of para,para'-isopropylidene diphenol and an epichlorohydrin.

4. The composition of claim 1 wherein the interpolymer is an interpolymer of methyl methacrylate and hydroxyethyl vinyl ether and the epoxy resin is a reaction product of para,para'-isopropylidene diphenol and an epihalohydrin.

5. The composition of claim 1 wherein the interpolymer is an interpolymer of methyl methacrylate and glycerol alpha-allyl ether and the epoxy resin is a reaction product of para,para'-isopropylidene diphenol and an epihalohydrin.

6. The composition of claim 1 wherein the interpolymer is an interpolymer of methyl methacrylate, glycidyl methacrylate and acrylonitrile.

7. The composition of claim 1 wherein the epoxy resin is tall oil fatty acid ester of the reaction product of para,para'-isopropylidene diphenol and an epihalohydrin.

8. An article of manufacture comprising a substrate having thereon an adherent coating of the resinous composition of claim 1 and having superimposed thereon a thermoplastic polymeric material.

9. The article of claim 8 wherein the said substrate is a metal surface and the said thermoplastic material is a fused plastisol comprising a thermoplastic polymer and a plasticizer therefor.

10. The article of manufacture of claim 9 wherein the said thermoplastic polymer is polyvinyl chloride.

11. The article of manufacture of claim 9 wherein the said thermoplastic polymer is a polymer of methyl methacrylate.

12. The article of claim 8 where the said substrate is a metal surface and the said thermoplastic material is an acrylic lacquer.

13. The article of claim 8 wherein the said thermoplastic polymeric material is a preformed sheet of polyvinyl chloride.

14. An article of manufacture comprising a substrate having thereon an adherent coating system comprising a layer of the composition of claim 1 having superimposed thereon a layer of a fused plastisol composition comprising a thermoplastic material and a plasticizer therefor.

References Cited by the Examiner

UNITED STATES PATENTS

| | | | |
|---|---|---|---|
| 2,569,954 | 10/51 | Ruebensaal | 156—332 |
| 2,787,603 | 4/57 | Sanders. | |
| 2,556,075 | 6/57 | Erickson | 260—78.4 |
| 2,823,140 | 2/58 | Lowell | 117—75 |
| 2,857,354 | 10/58 | Fang | 260—78.4 |
| 2,868,760 | 1/59 | Staicopoulos | 260—86.1 |
| 2,872,366 | 2/59 | Kierman et al. | 156—332 XR |
| 2,949,383 | 8/60 | Blake | 117—75 |
| 2,958,611 | 11/60 | Ulrich | 117—75 |
| 3,011,909 | 12/61 | Hart et al. | 117—75 X |
| 3,025,181 | 3/62 | Nuessle et al. | 117—161 XR |
| 3,069,291 | 12/62 | Levine et al. | 117—75 |
| 3,086,904 | 4/63 | Uhleen | 154—43 |

FOREIGN PATENTS

| | | |
|---|---|---|
| 809,257 | 2/59 | Great Britain. |
| 845,046 | 8/60 | Great Britain. |

OTHER REFERENCES

Modern Plastics Encyclopedia (1957), vol. 35, No. 1A, p. 179.

Hackh's Chemical Dictionary, McGraw-Hill, 1944.

WILLIAM D. MARTIN, *Primary Examiner.*

RICHARD D. NEVIUS, *Examiner.*